United States Patent [19]
McDermott

[11] 3,782,866
[45] Jan. 1, 1974

[54] ROTARY FLUID PRESSURE DEVICE

[76] Inventor: Hugh L. McDermott, 6101 Ashcraft Ave., Minneapolis, Minn. 55424

[22] Filed: May 30, 1972

[21] Appl. No.: 257,915

[52] U.S. Cl............................ 418/61, 64/9 R, 64/31
[51] Int. Cl......... F16d 3/04, F01c 1/02, F03c 3/00
[58] Field of Search................ 418/61; 64/9 R, 31

[56] References Cited
UNITED STATES PATENTS

| | | | |
|---|---|---|---|
| 3,288,078 | 11/1966 | Monroe et al. | 418/61 |
| 3,289,601 | 12/1966 | Compton | 418/61 |
| 2,744,449 | 5/1956 | Belden et al. | 64/9 R |
| 3,352,247 | 11/1967 | Easton | 418/61 |

Primary Examiner—Carlton R. Croyle
Assistant Examiner—John J. Vrablik
Attorney—Ralph F. Merchant et al.

[57] ABSTRACT

A rotary fluid pressure positive displacement mechanism operative selectively as a fluid pump or motor and including a relatively stationary internally toothed member and a relatively rotary externally toothed rotor having one tooth less than the internally toothed member and in meshing engagement therewith. The rotor partakes of rotary and orbital movement within the internally toothed member with the axis of the rotor describing an orbit around the axis of the internally toothed member. A drive shaft is journalled for rotation on the axis of the internally toothed member and is operatively connected to the rotor.

4 Claims, 4 Drawing Figures

PATENTED JAN 1 1974 3,782,866

ROTARY FLUID PRESSURE DEVICE

BACKGROUND OF THE INVENTION

Rotary fluid pressure devices of the type utilizing cooperating internally toothed and externally toothed members are known, examples of these being found in U. S. Pat. No. 2,821,171, 2,984,215, 2,989,951 and 3,233,524. In these devices, a drive shaft is disposed on the axis of the stationary one of the toothed members and is eccentric to the rotary toothed member, the axis of the rotary toothed member describing an orbit about the axis of the stationary toothed member. The orbiting and rotating member is connected to the drive shaft by a connector having an axis oblique to the axes of the toothed members, and gear teeth at its opposite ends having generally longitudinally sliding meshing engagement with teeth on the rotary and orbiting member and on the drive shaft. Due to size limitations in devices of the type exemplified by the above-mentioned patents, particularly in the root diameters of the external teeth of the externally toothed members, the central toothed opening in these externally toothed rotating and orbital members are quite small as are the teeth therein. The small size of the teeth of these members, as well as the teeth of the connector intermeshing therewith, make this connection a weak area of the entire structure, and one wherein undue wear occurs. Early failure of the parts in this area necessitates rather frequent disassembly of the device and replacement of the worn or broken parts.

SUMMARY OF THE INVENTION

An important object of this invention is the provision of a rotary fluid pressure device having substantially greater strength in the parts thereof, for a given overall size, than similar devices heretofore produced.

Another object of this invention is the provision of a rotary fluid pressure device having substantially longer wearing qualities than similar devices heretofore produced.

To these ends, I provide a rotary fluid pressure device including a casing which defines a chamber including an internally toothed member defining a peripheral wall of the chamber, an externally toothed member having one tooth less than the internally toothed member in meshing engagement with the internally toothed member and eccentric thereto, a gear shaft rigid with the externally toothed member and extending axially therefrom, a drive shaft journalled in the casing on the axis of the internally toothed member, and a connector element having enlarged opposite ends. The gear shaft and drive shaft have diametrically enlarged ends disposed adjacent the opposite ends of the connector element remote from the teeth of the externally toothed member, the connector element and enlarged shaft ends having interengaging drive surfaces whereby rotation of one of the gear and drive shafts is imparted to the other thereof.

DETAILED DESCRIPTION OF THE PREFERRED EMBODIMENT

Figure 1:
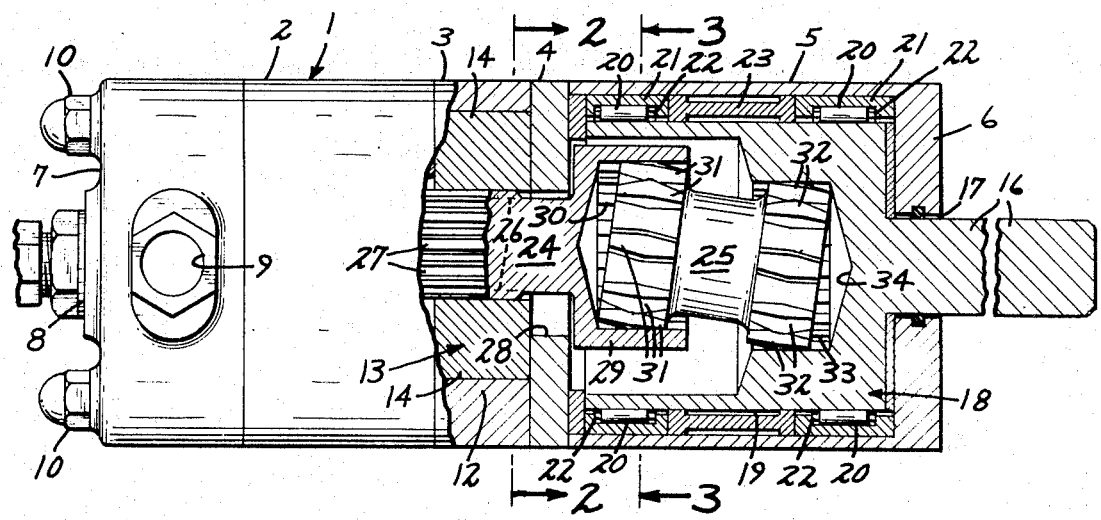
FIG. 1 is a view in side elevation of a rotary fluid pressure device containing the improvement of this invention, some parts being broken away and some parts being shown in section.
Figure 2:
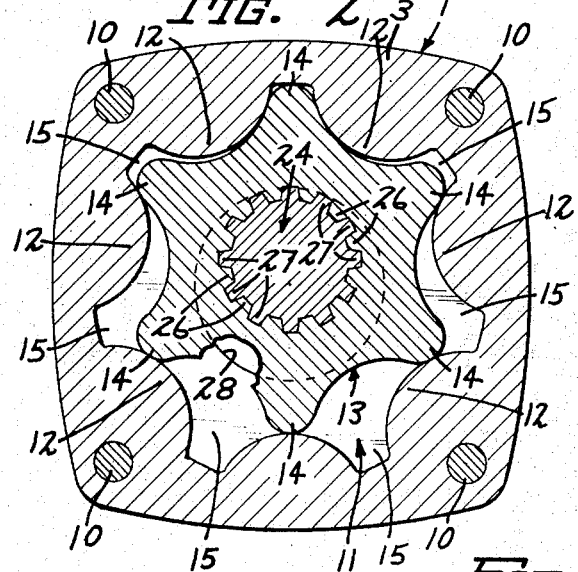
FIGS. 2 and 3 are enlarged transverse sections taken on the lines 2—2 and 3—3 respectively of FIG. 1.
Figure 3:
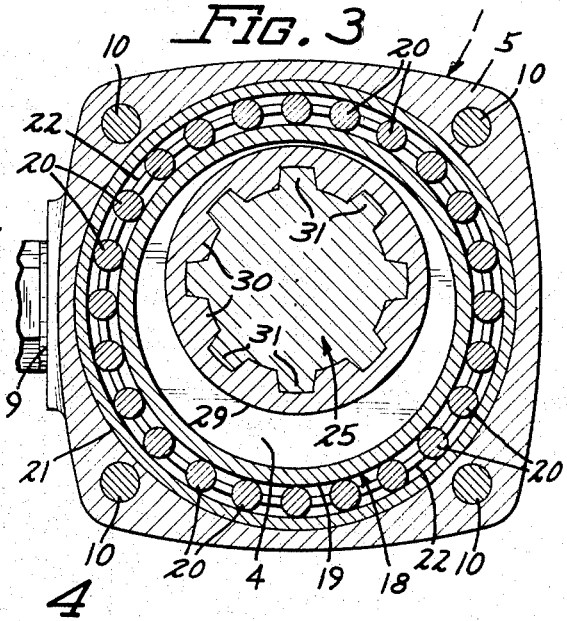

In FIGS. 1–3 a casing, indicated generally at 1, comprises a plurality of casing sections 2, 3, 4 and 5, the casing section 5 providing an end wall 6 for the casing 1. The casing section 2 provides an opposite end wall 7 having therein a port 8. At one side, the casing section 2 is formed to provide a second port 9, the ports 8 and 9 being inlet and outlet ports interchangeably as desired. The casing sections 2–5 are rigidly held together in axial alignment by a plurality of circumferentially spaced machine screws 10.

The casing sections 2, 3 and 4 cooperate to define a rotor chamber, indicated at 11 in FIG. 2, the casing section 3 defining a plurality of circumferentially spaced internal teeth 12. In the embodiment illustrated in the drawings, the teeth 12 are seven in number. An externally toothed rotor 13 is disposed in the chamber 11, the rotor 13 having a plurality of circumferentially spaced teeth 14 that are adapted to move into and out of meshing engagement with the teeth 12. The teeth 14 are one less in number than the teeth 12, and cooperate with the teeth 12 to divide the chamber 11 into chamber sections 15 that alternately expand and contract as the externally toothed member 13 rotates within the chamber 11. During such rotation of the externally toothed member or rotor 13, the same partakes of orbital movement, the axis thereof orbiting about the axis of the internally toothed member or casing section 3. Commutating valve means, not shown, are contained within the casing section 2 for supplying fluid to the expanding chamber sections 15 and withdrawing fluid from the contracting chamber sections 15 during rotary and orbital movement of the externally toothed rotor member 13. Such valve means are clearly disclosed in one or more of the above-mentioned U. S. patents and, in and of themselves do not comprise the instant invention. Hence, in the interest of brevity, detailed showing and description thereof is omitted.

A drive shaft 16 extends axially outwardly through an axial opening 17 in the end wall 6 of the casing 1, in axial alignment with the internally toothed member or casing section 3. Inwardly of the casing section 5, the drive shaft 16 is formed to provide a diametrically enlarged cylindrical head 18 which includes a cylindrical skirt portion 19, the head 18, with its skirt 19 being journalled in the casing section 5 by means of roller bearings 20. The roller bearings 20 are conventional in nature, being supported in outer races 21 and annular cages 22, the races 21 being held in axially spaced apart relationship by an annular spacer 23.

Means for operatively connecting the externally toothed rotor member 13 to the drive shaft 16 comprises a gear shaft 24 and a cooperating connector element 25. The externally toothed rotor member 13 is provided with an axial opening formed to provide circumferentially spaced spline teeth 26 that mesh with cooperating spline teeth 27 on the gear shaft 24, the gear shaft 24 being preferably press-fitted in the splined opening of the rotor 13. Although not specifically shown, it may be assumed that one end of the shaft 24 is operatively connected to the valve mechanism within the casing section 2 to provide proper valving for the apparatus.

The gear shaft 24 extends through an opening 28 in the wall or casing section 4, the opening 28 being coaxial with the internally toothed member 3 and drive shaft 16, the opening 28 having a diameter sufficiently less than the root diameter of the external teeth 14 on the member 13 so that the member 13 covers the opening 28 at all times during its orbital and rotary movement in the chamber 11, see FIG. 2. Axially outwardly of the opening 28, the gear shaft 24 includes a diametrically enlarged head 29 that is disposed within the recess defined by the drive shaft skirt 19. The head 29 is formed to provide an axial recess having circumferentially spaced internal teeth 30 therein. The teeth 30 have axially sliding meshing engagement with cooperating teeth 31 at one end of the connector element 25. At its opposite end, the connector element 25 is formed to provide circumferentially spaced external teeth 32 similar to the teeth 31, these having meshing engagement with cooperating internal teeth 33 formed within an axial recess 34 in the enlarged head 18, the teeth 33 being substantially identical to the teeth 30. The offset relationship between the heads 18 and 29 disposes the connector element 25 on an axis that is oblique to the offset parallel axes of the drive shaft 16 and gear shaft 24, as clearly shown in FIG. 1. The gear teeth 30–33 are so shaped that, when orbital and rotary movement is imparted to the gear shaft 24, or when rotary movement is imparted to the drive shaft 16, the teeth 31 and 32 of the connector element 25 partake of a rocking and axial sliding movement relative to their respective teeth 30 and 33. By providing a gear shaft 24 that is rigidly secured to the externally toothed gear 13, and which shaft has an internally toothed head the inner diameter of which is substantially larger than the splined opening in the externally toothed gear 13, I am able to provide cooperating teeth 30 and 31 that have substantially greater thickness and interengaging surface areas than have been heretofore possible. Further, in view of the tight fit between the externally toothed gear member 13 and the gear shaft 24, a stronger connection therebetween is had, without wear on the spline teeth 26 and 27.

DETAILED DESCRIPTION OF MODIFIED ARRANGEMENT

Figure 4:
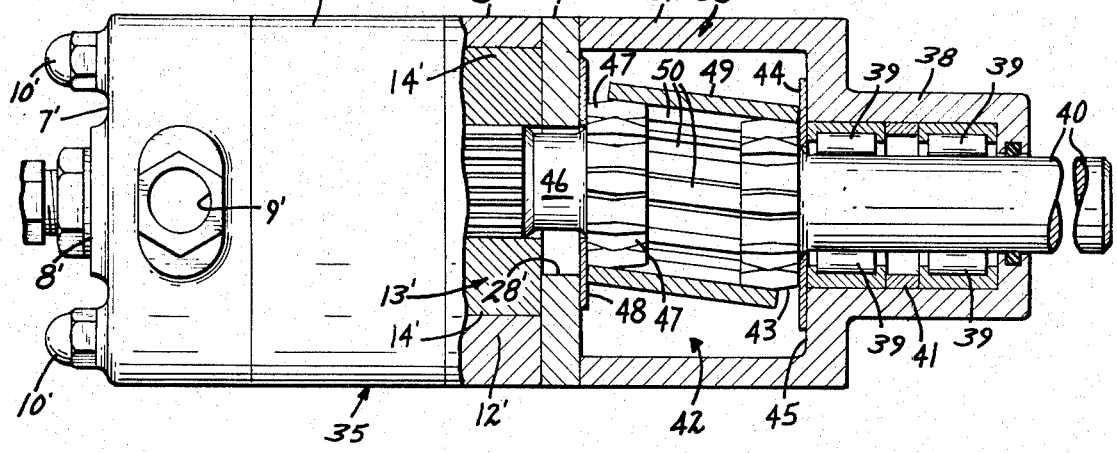
FIG. 4 is a view corresponding to FIG. 1 but showing a modified arrangement.

In the modified form of the invention illustrated in FIG. 4, an elongated casing 35 is shown as comprising casing sections 2', 3', 4' and 36, the casing sections 2', 3', and 4' being identical to the casing sections 2, 3 and 4. The casing section 3' contains an externally toothed gear member 13' identical to the gear member 13. The casing sections 2', 3', 4' and 36 are secured together in end-to-end relationship in the same manner as the casing 1, by machine screws 10'.

The casing section 36 is formed to provide a relatively larger transverse portion 37 and a relatively smaller transverse or diameter hub portion 38, the hub portion 38 containing roller bearings 39 which journal a drive shaft 40 in axial alignment with the internally toothed casing section 3'. The bearings 39 are held in spaced apart relationship by an annular spacer 41. The casing section 36 cooperates with the casing section 4' to define an enlarged chamber 42 into which the drive shaft 40 projects. The inner end of the drive shaft 40 is formed to provide an enlarged externally toothed head 43 within the chamber 42. An annular wear plate 44 is disposed between the toothed head 43 and the adjacent annular wall surface of the casing section 36, the annular wall surface being indicated at 45.

A splined gear shaft 46 is press-fitted in the externally toothed gear 13' and projects through an opening 28' in the casing section 4', the gear shaft 46 terminating within the chamber 42 in an enlarged externally toothed head 47 identical to the toothed head 43 on the drive shaft 40. An annular wear plate 48 is disposed between the toothed head 47 and the adjacent surface of the casing section 4'.

As shown, the shafts 40 and 46 are disposed in laterally offset parallel relationship, in the same manner as the shafts 16 and 24, the toothed heads 43 and 47 being connected by a tubular connector element 49 having internal teeth 50 that extend longitudinally thereof and have intermeshing axial sliding engagement with the external teeth on the heads 43 and 47. The opposite ends of the tubular connector element 49 are adapted to slideably engage the wear plates 44 and 48 to limit axial movement of the connector element 49. The tubular connector element 49 operates in the same manner as the connector element 25, the arrangement being such that the teeth 43, 47 and 50 have substantially greater thickness and wearing surface areas than connectors heretofore used directly between the drive shaft and externally toothed gear member.

I have found that, with the driving connections shown in both FIGS. 1 and 4, a greatly extended useful life is obtained in fluid pressure devices of the type hereinbefore described. While I have shown and described a commercial embodiment of my improved construction, and a single modified form thereof, it will be understood that the same is capable of further modification without departure from the spirit and scope of the invention, as defined in the claims.

What is claimed is:

1. In a rotary fluid pressure device comprising, a casing including an internally toothed relatively stationary gear, a cooperating externally toothed gear having at least one less tooth than said internally toothed gear and disposed therein for intermeshing engagement therewith and for rotary and orbital movement wherein the axis of said externally toothed gear describes an orbit around the axis of the internally toothed gear, said externally toothed gear having an axial opening therethrough, and a drive shaft journalled in said casing on the axis of said internally toothed gear; the improvement comprising, a gear shaft rigidly mounted in said axial opening and extending axially from said externally toothed gear for rotary and orbital movement in common therewith, an enlarged head on said gear shaft axially spaced from said externally toothed gear, an enlarged inner head on said drive shaft, and a connector element having an axis disposed oblique to the axes of said gear shaft and drive shaft, said enlarged heads and connector element having intermeshing gear teeth of a diameter substantially greater than the diameter of said axial opening in the externally toothed gear.

2. The rotary fluid pressure device defined in claim 1 in which said axial opening defines a plurality of circumferentially spaced spline teeth, said gear shaft having spline teeth interfitting the teeth in said axial opening, the intermeshing teeth on said heads and connector element having substantially greater circumferential and radial measurement than said spline teeth.

3. The rotary fluid pressure device defined in claim 2 in which said enlarged heads on the gear and drive shafts define axial recesses, the teeth of said enlarged heads comprising internal gear teeth in said recesses, the teeth on said connector element being external gear teeth.

4. The rotary fluid pressure device defined in claim 2 in which the teeth on said enlarged gear shaft and drive shaft heads comprise external gear teeth, said connector element comprising a tube having an inner surface, the teeth of said connector element being internal gear teeth defining at least a portion of said inner surface.

* * * * *